March 9, 1926.  
E. H. BISPHAM  
BRACKET  
Filed Dec. 27, 1921
1,575,963
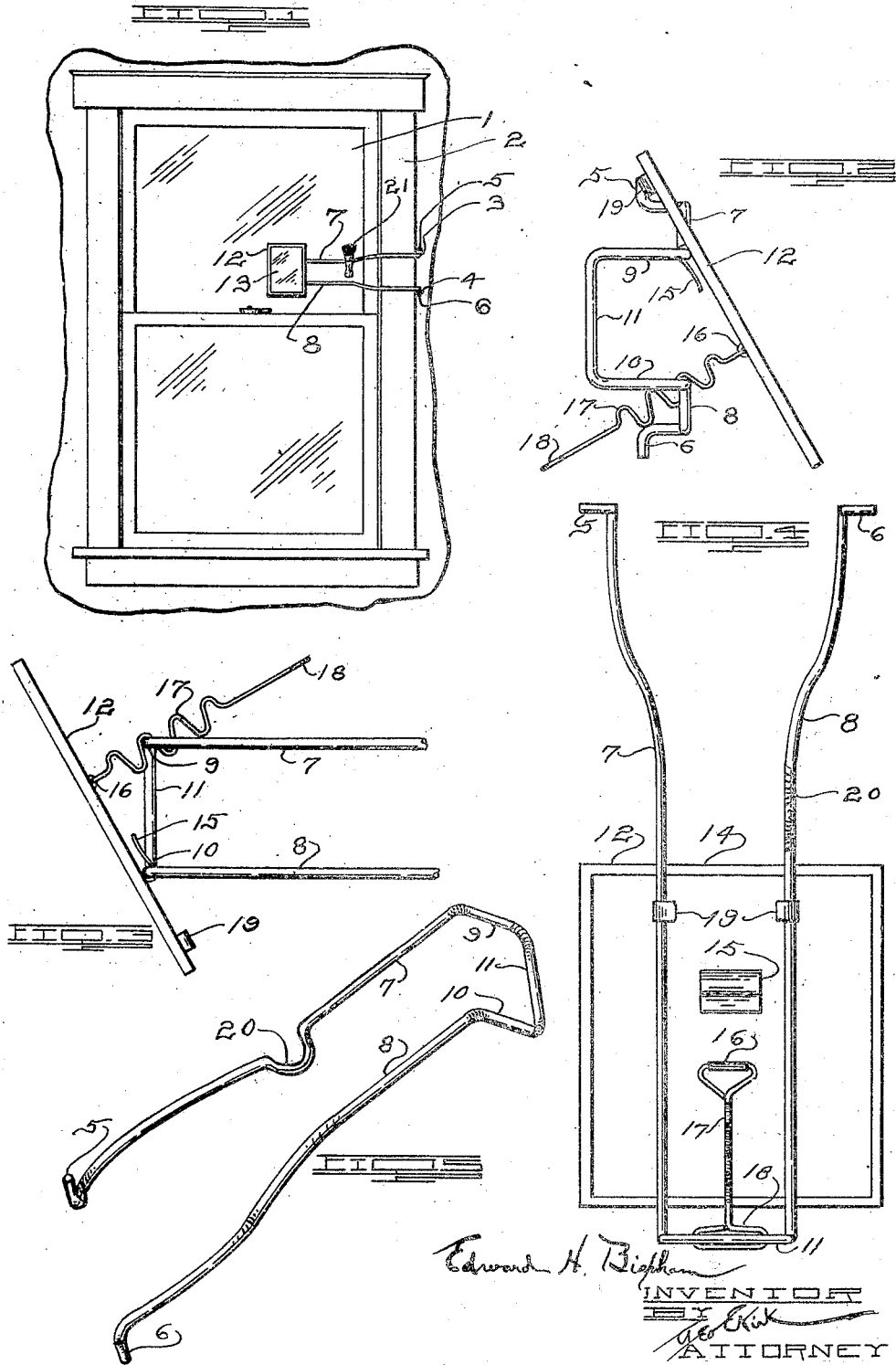

Patented Mar. 9, 1926.

1,575,963

UNITED STATES PATENT OFFICE.

EDWARD H. BISPHAM, OF MAUMEE, OHIO.

BRACKET.

Application filed December 27, 1921. Serial No. 524,909.

*To all whom it may concern:*

Be it known that I, EDWARD H. BISPHAM, a citizen of the United States of America, residing at Maumee, Lucas County, Ohio, have invented new and useful Brackets, of which the following is a specification.

This invention relates to bracket devices.

This invention has utility when incorporated as an adjustable mounting for mirrors.

Referring to the drawings:

Fig. 1 is a showing of an embodiment of the invention as disposed adjacent a window to be used as a shaving outfit;

Fig. 2 is a side elevation, on an enlarged scale, showing the position of the mirror as adjusted in Fig. 1;

Fig. 3 shows the mounting of the mirror reversely to that of the showing in Fig. 2 and still further changed to be on the offset on the U-end of the bracket member;

Fig. 4 shows the rear elevation of the mirror as mounted on the multi-purpose holding bracket as for suspension; and Fig. 5 is a perspective view of the spring arm bracket for the mirror.

Window 1 is shown as having side frames 2 carrying a pair of eyes 3, 4, having the opening of the eyes aligned. Pivot pin portions 5, 6, are shown as oppositely thrown into the respective eyes 3, 4, by spring arms 7, 8, of a U-shaped member. The spring arm members 7, 8, have offset portions 9, 10, connected by intermediate portion 11 and make the U of this U-shaped bracket member.

This spring bracket member is a multi-use bracket designed to mount or carry in varied adjusted positions a device herein shown as a frame 12 having a reflector or mirror surface 13. This mirror frame 12 is shown as having a back 14 carrying medially or intermediately a spring clip 15 which may be snapped into various positions over the one or the other of the various arms 7, 8, 9, 10, at positions thereon as may be found convenient. Besides swinging this bracket on its hinge pins 5, 6, the position of this mounted frame may be as selected anywhere along the spring arms.

There is a decided advantage in shaving in getting the proper tilt which may be more acceptable as to the light or to the height of the one shaving. To this end a loop 16 on the back 14 of this frame 12 carries a notched rod or bar 17 having a terminal handle 18. With the clip 15 engaging say the upper arm 7 or 9, the notched portion 17 may be allowed to adjust or ride along the arm 8, 10, responding to the position of the clip 15 on the opposite arm 7 or 9 to tilt the frame 12 outward. Oppositely when the clip 15 is engaging the lower bar 8, 10, the notched arm 17 may be allowed to ride on the upper arm 7 or 9 to tilt the upper part of the frame 12 outward. Still again when the frame is not to be carried by this multi-use bracket, the mirror may be held in set up position by this strut or rod 17, 18, as connected by the loop 16 to the back 14 of the frame 12. Besides these hinged positions of mounting for swinging the frame member 12 as to the adjustable bracket member, there may be a positive or rigid mounting of this frame 12 in any desired position along this swing bracket member or the offset of the bracket member. To this end a pair of clips 19 are disposed for simultaneous engagement of the parallel portions of the arms 7, 8, or 9, 10, of the U-shaped spring bracket member. These clips 19 hold the frame 12 against the bracket member and this bracket member may be swung to any position as desired or the minor offsets 9, 10, of the arms 7, 8, may serve to suspend the mounted frame member say upon the cross bar of the window or from any other ledge as may be found acceptable.

In the use of the device as a shaving outfit, loop portion or notch 20 may serve to hold a shaving brush 21.

There is accordingly provided by this simple bracket member a multiplicity of uses in positioning and mounting say of a mirror for toilet use. This device may have very acceptable purposes in the outfit of one traveling for it is compact and light and will permit of such a range of uses that in almost any situation there may be found a way of placing the mirror so that it may better serve the purpose of the one desiring to use it as to the light regardless of whether such light be from a natural source or artificial source within a room or apartment of one carrying the outfit.

The offsets or bent portions of the arms 7, 8, adjacent the portions 5, 6, permit clearance so that the eyes 3, 4, may be placed at the edge of the frame 2 and thereby in no way disfigure the woodwork.

What is claimed and it is desired to secure by Letters Patent is:—

1. A mirror provided with a back having a clip, a support therefor embodying a U-bracket member with which the clip may engage independently of the cross portion of the U of said bracket member, a mounting for the support, and an adjustable strut from the U-bracket member to the mirror for swinging the mirror upon its clip mounting with the bracket, said adjustment of the support being effective independently of shifting the bracket member as to its mounting.

2. A first mirror member to be mounted provided with a pair of opposing clip means, a support for the member embodying a spring arm U-shaped second bracket member for mounting the first member by engaging by oppositely snapping into said clip means independently of the cross portion of the U of said bracket member, the arms of said U-shaped bracket member having offset portions at their free ends terminating in oppositely extending pivot pins, and a pair of supporting eyes for swingably sustaining the second member.

3. A first mirror member to be mounted provided with one pair of clips and a third clip, and a spring arm U-shaped second bracket member with which the pair of clips may be engaged for holding the first member fixed with the second member and with which the third clip may be engaged independently of the holding of the first pair of clips, said third clip engaging for swingably mounting the first member as to the second member, said first member being provided with a strut pivoted thereto for engaging the second member when mounted by the third clip for adjustably coacting with the second member to hold the first member against swinging.

4. The combination with a pair of aligned eyes, of a spring arm bracket member having opposite offset free ends to be sprung into said eyes as a hinge, said member having arms extending from the ends to an offset connecting portion, a member to be mounted having clips to engage one of the arms, and a hinged strut carried by the member to the mounting, said strut having notches to coact with the other arm of the bracket member in adjusting the member to be mounted in position.

In witness whereof I affix my signature.

EDWARD H. BISPHAM.